(12) United States Patent
Derose (10) Patent No.: US 10,843,636 B1
(45) Date of Patent: Nov. 24, 2020

(54) PORTABLE EXERCISE SYSTEM FOR USE WITH A TRAILER OR TRUCK FRAME

(71) Applicant: Ricardo Derose, Winter Park, FL (US)

(72) Inventor: Ricardo Derose, Winter Park, FL (US)

( * ) Notice: Subject to any disclaimer, the term of this patent is extended or adjusted under 35 U.S.C. 154(b) by 0 days.

(21) Appl. No.: 16/398,411

(22) Filed: Apr. 30, 2019

(51) Int. Cl.
| | | |
|---|---|---|
| B60R 9/08 | (2006.01) | |
| A63B 23/12 | (2006.01) | |
| A63B 21/00 | (2006.01) | |
| B60R 9/06 | (2006.01) | |
| A63B 21/16 | (2006.01) | |
| A63B 21/068 | (2006.01) | |

(52) U.S. Cl.
CPC .............. *B60R 9/08* (2013.01); *A63B 21/068* (2013.01); *A63B 21/16* (2013.01); *A63B 21/4035* (2015.10); *A63B 23/1218* (2013.01); *A63B 23/1227* (2013.01); *B60R 9/06* (2013.01)

(58) Field of Classification Search
CPC . B60R 9/06–08; A63B 21/16; A63B 21/4035; A63B 23/1218–1227
See application file for complete search history.

(56) References Cited

U.S. PATENT DOCUMENTS

| | | | | |
|---|---|---|---|---|
| 5,558,608 A | * | 9/1996 | Hall | A63B 21/0552 482/129 |
| 5,620,125 A | * | 4/1997 | Duncan | A63B 55/60 224/515 |
| 6,210,306 B1 | | 4/2001 | Miller | |
| 8,485,951 B1 | * | 7/2013 | Adams | A63B 21/04 224/403 |
| 8,535,204 B2 | | 9/2013 | Stacey | |
| 8,734,305 B1 | * | 5/2014 | Hoole | A63B 23/1218 482/105 |
| 9,302,144 B1 | * | 4/2016 | Benavides | A63B 21/068 |
| 9,320,934 B1 | * | 4/2016 | Pringle | A63B 23/03558 |
| 2002/0077188 A1 | * | 6/2002 | Anzaldua | A63B 69/0079 473/139 |
| 2006/0186638 A1 | | 8/2006 | Varner | |
| 2008/0128463 A1 | * | 6/2008 | Bryan | B60R 9/06 224/486 |
| 2009/0023566 A1 | * | 1/2009 | Florczak | A63B 23/12 482/142 |
| 2013/0053220 A1 | * | 2/2013 | Monaco | A63B 17/04 482/39 |
| 2014/0296037 A1 | * | 10/2014 | Razzaq | A63B 21/06 482/54 |
| 2017/0096091 A1 | * | 4/2017 | Johnson | B60P 3/00 |
| 2017/0100624 A1 | * | 4/2017 | Young | A63B 23/1218 |

FOREIGN PATENT DOCUMENTS

WO 2017129271 8/2017

* cited by examiner

*Primary Examiner* — Jennifer Robertson (74) *Attorney, Agent, or Firm* — Kyle A. Fletcher, Esq.

(57) ABSTRACT

The portable exercise system for use with a trailer or truck frame is configured for use with one or more bumper slots located on the rear bumper of the trailer. The portable exercise system for use with a trailer or truck frame is a kit that creates static structures that are attached to the trailer using the one or more bumper slots. The portable exercise system for use with a trailer or truck frame comprises a plurality of removable bollards and a plurality of grips. The plurality of removable bollards attach the plurality of grips to the one or more bumper slots. The plurality of removable bollards form the static structures. The plurality of grips allow for exercises that require a controlled change in elevation relative to the horizontal surface formed by the trailer.

16 Claims, 9 Drawing Sheets

PORTABLE EXERCISE SYSTEM FOR USE WITH A TRAILER OR TRUCK FRAME

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sports, games, and amusements including exercise equipment that strengthens muscles by working against a counterforce, more specifically, an exercise device that does not move during use.

SUMMARY OF INVENTION

The portable exercise system for use with a trailer or truck frame is configured for use with a trailer. The trailer is further configured with a one or more bumper slots located on the rear bumper of the trailer. Each of the one or more bumper slots is a rectangular prism-shaped negative space formed in the superior surface of the rear bumper. The portable exercise system for use with a trailer or truck frame is configured for use in exercise. Specifically, the portable exercise system for use with a trailer or truck frame is a kit that creates static structures that are attached to the trailer using the one or more bumper slots. The portable exercise system for use with a trailer or truck frame comprises a plurality of removable bollards and a plurality of grips. The plurality of removable bollards attach the plurality of grips to the one or more bumper slots. The plurality of removable bollards form the static structures. The plurality of grips allow for exercises that require a controlled change in elevation relative to the horizontal surface formed by the trailer.

These together with additional objects, features and advantages of the portable exercise system for use with a trailer or truck frame will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable exercise system for use with a trailer or truck frame in detail, it is to be understood that the portable exercise system for use with a trailer or truck frame is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable exercise system for use with a trailer or truck frame.

It is therefore important that the claims be regarded as including such equivalent construction insofar as they do not depart from the spirit and scope of the portable exercise system for use with a trailer or truck frame. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
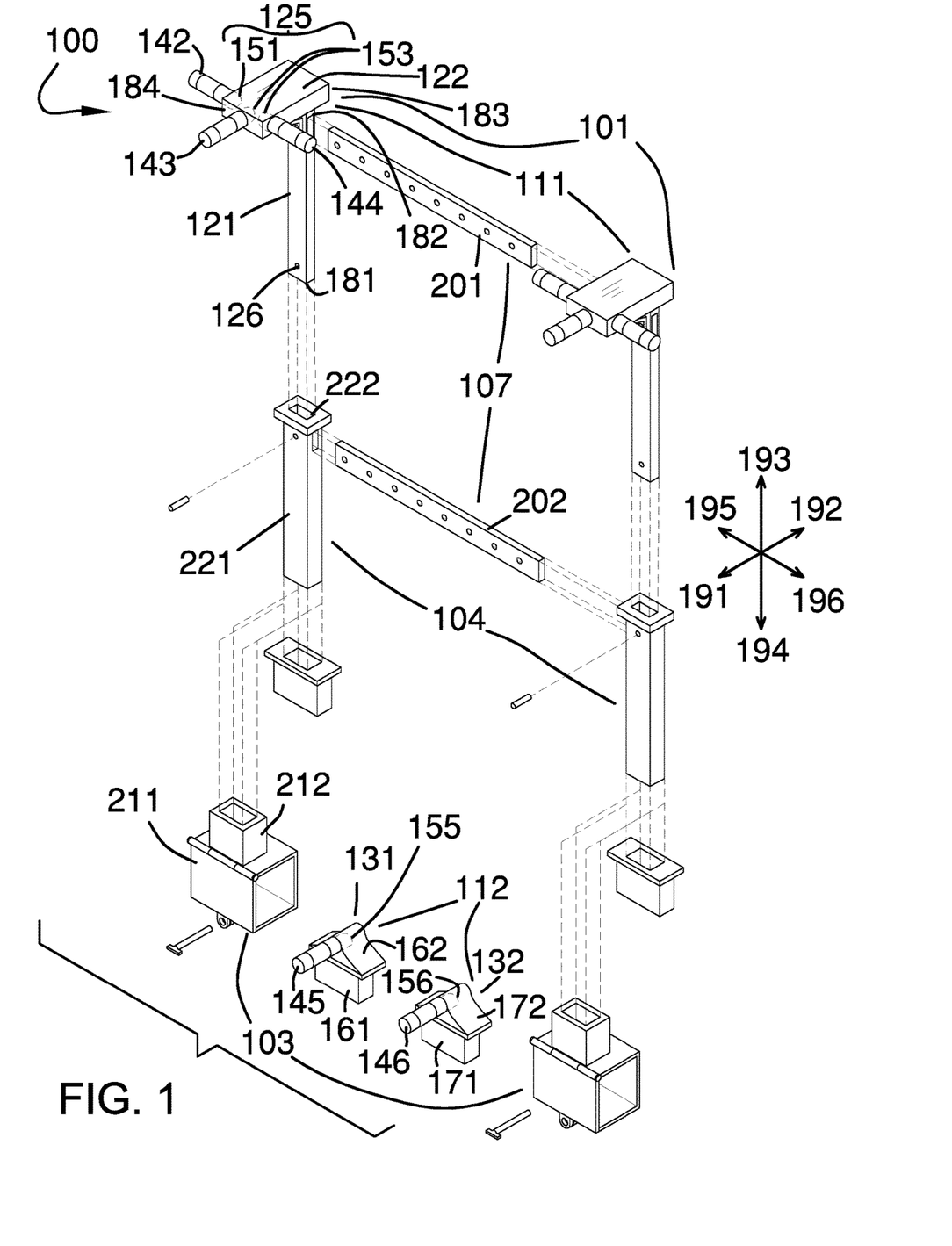
FIG. 1 is a perspective view of an embodiment of the disclosure.
Figure 2:
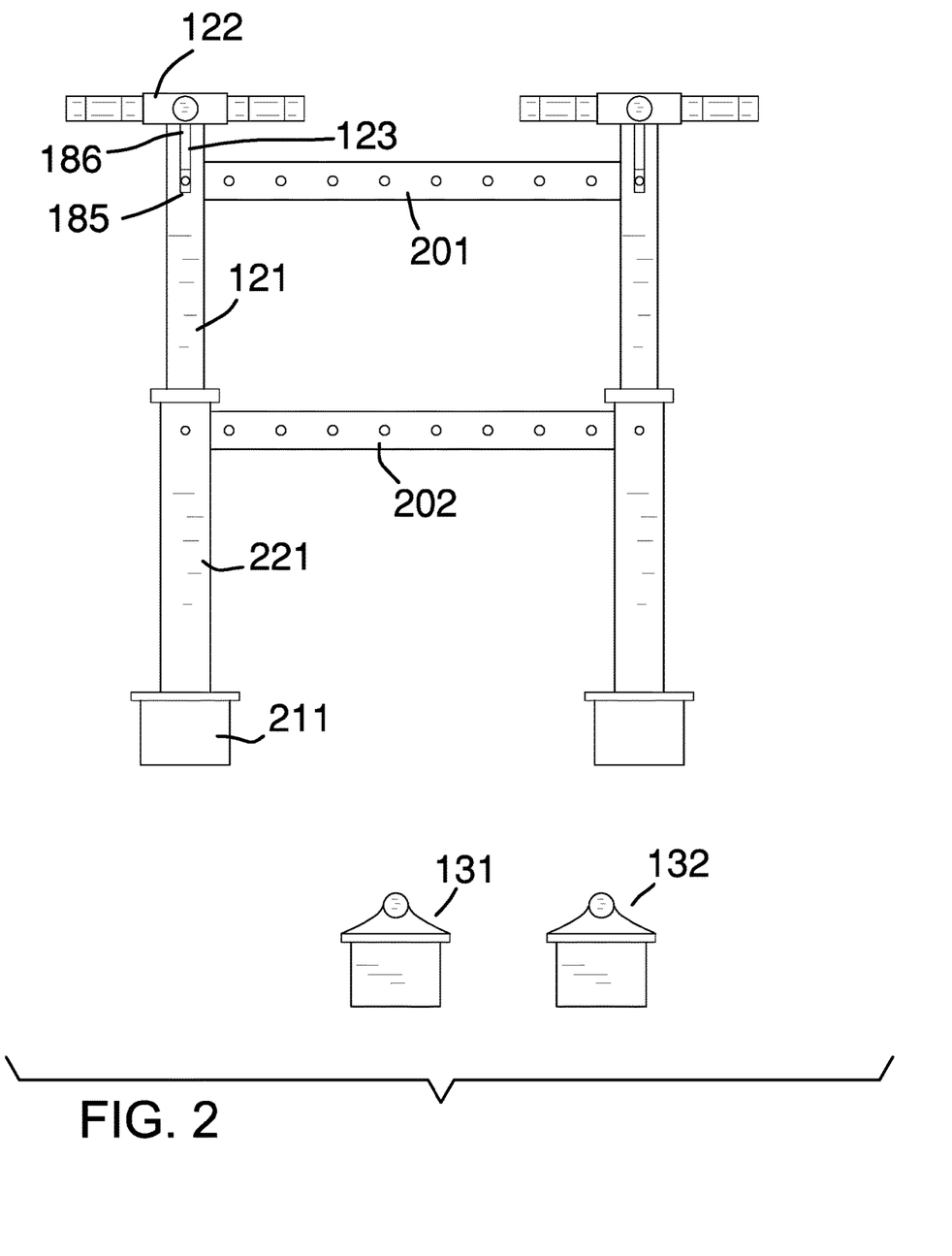
FIG. 2 is a front view of an embodiment of the disclosure.
Figure 3:
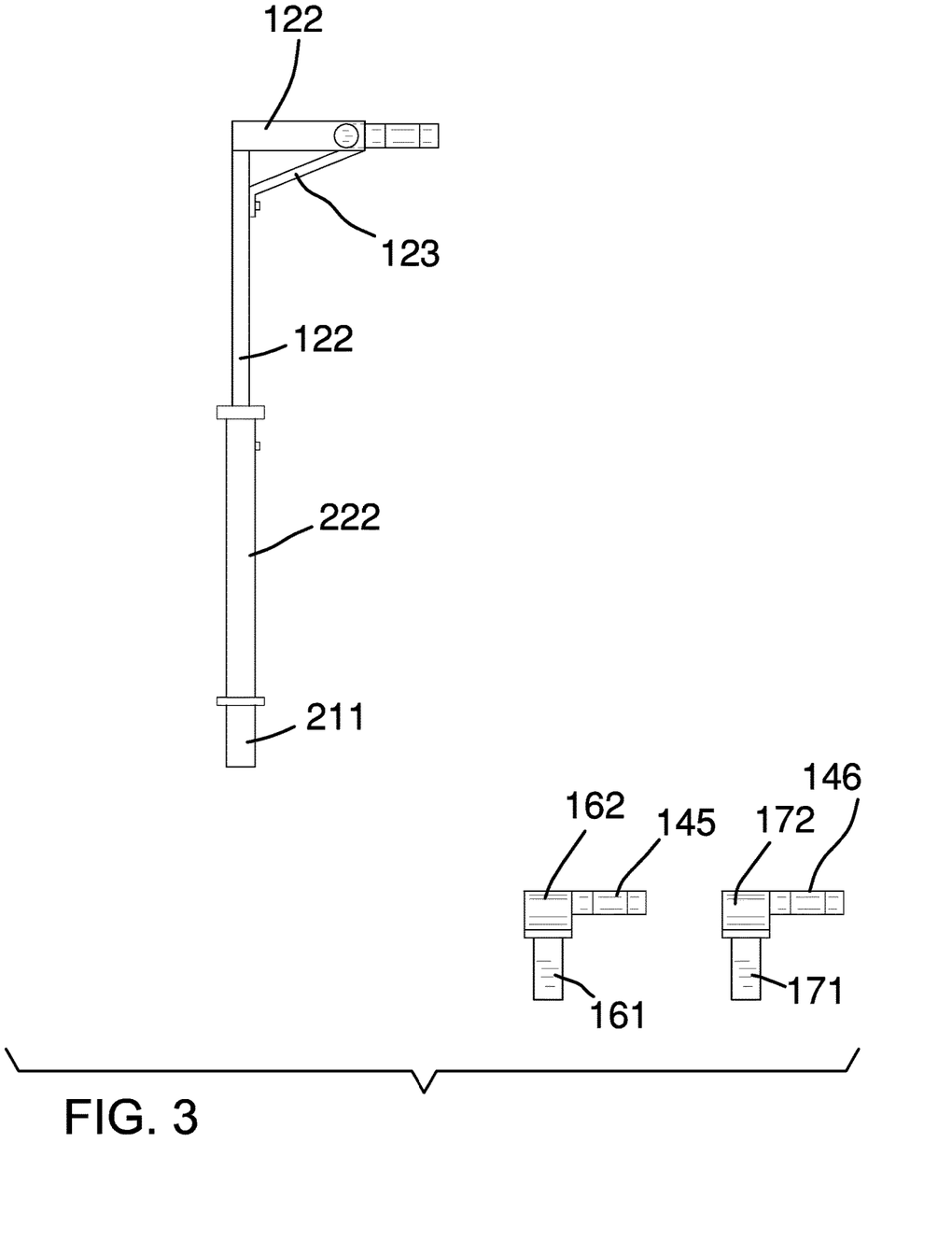
FIG. 3 is a side view of an embodiment of the disclosure.
Figure 4:
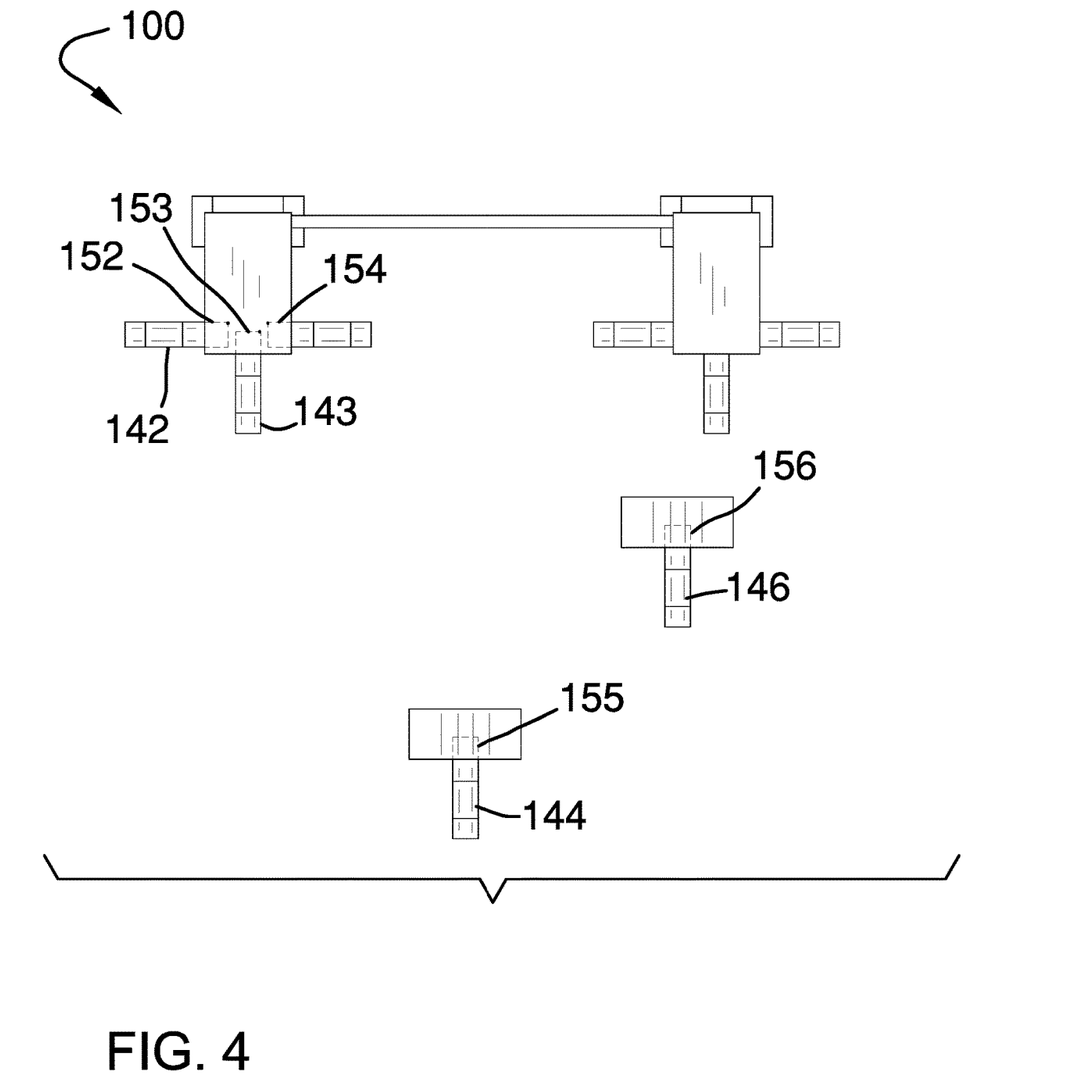
FIG. 4 is a top view of an embodiment of the disclosure.
Figure 5:
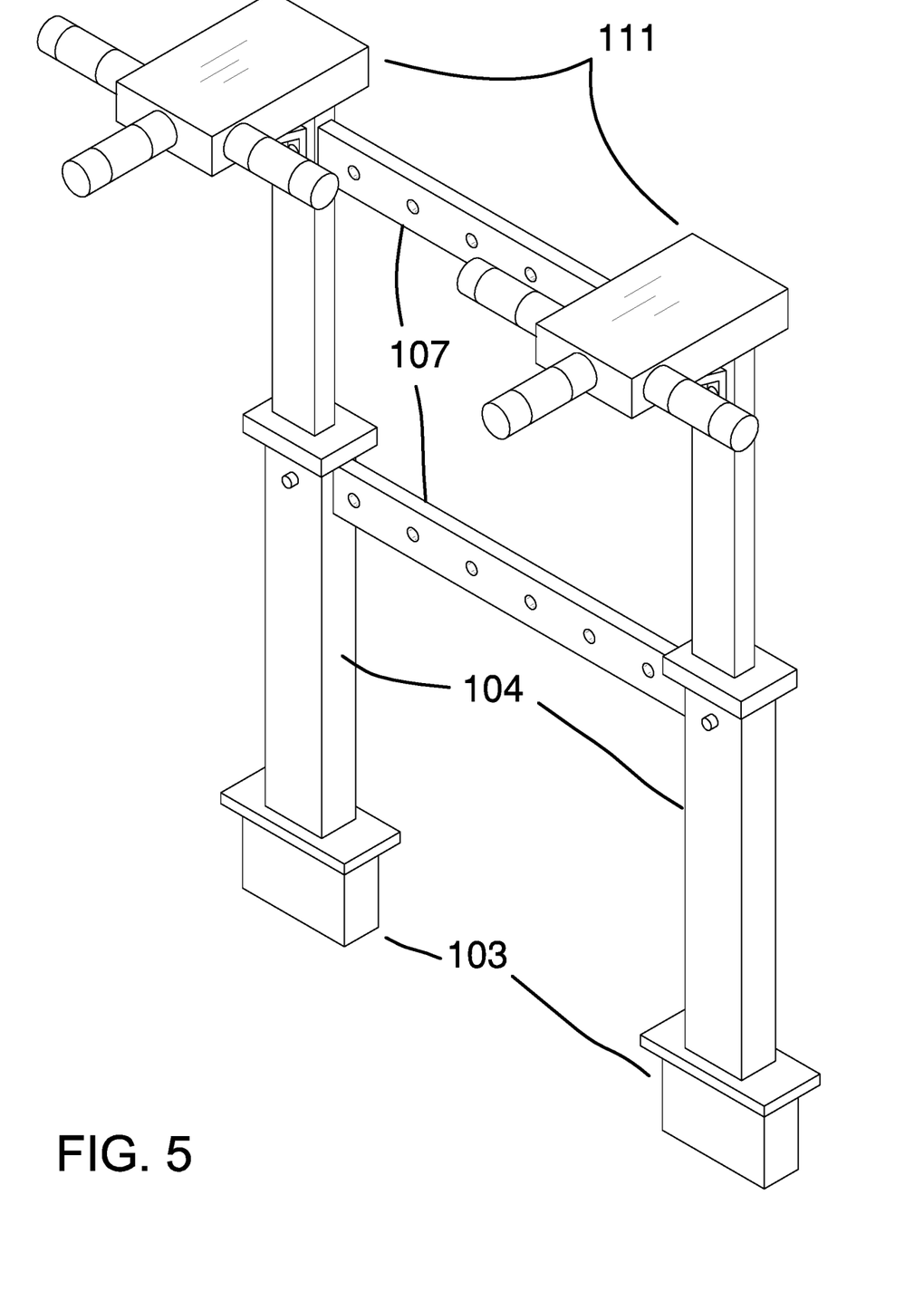
FIG. 5 is an in-use view of an embodiment of the disclosure.
Figure 6:
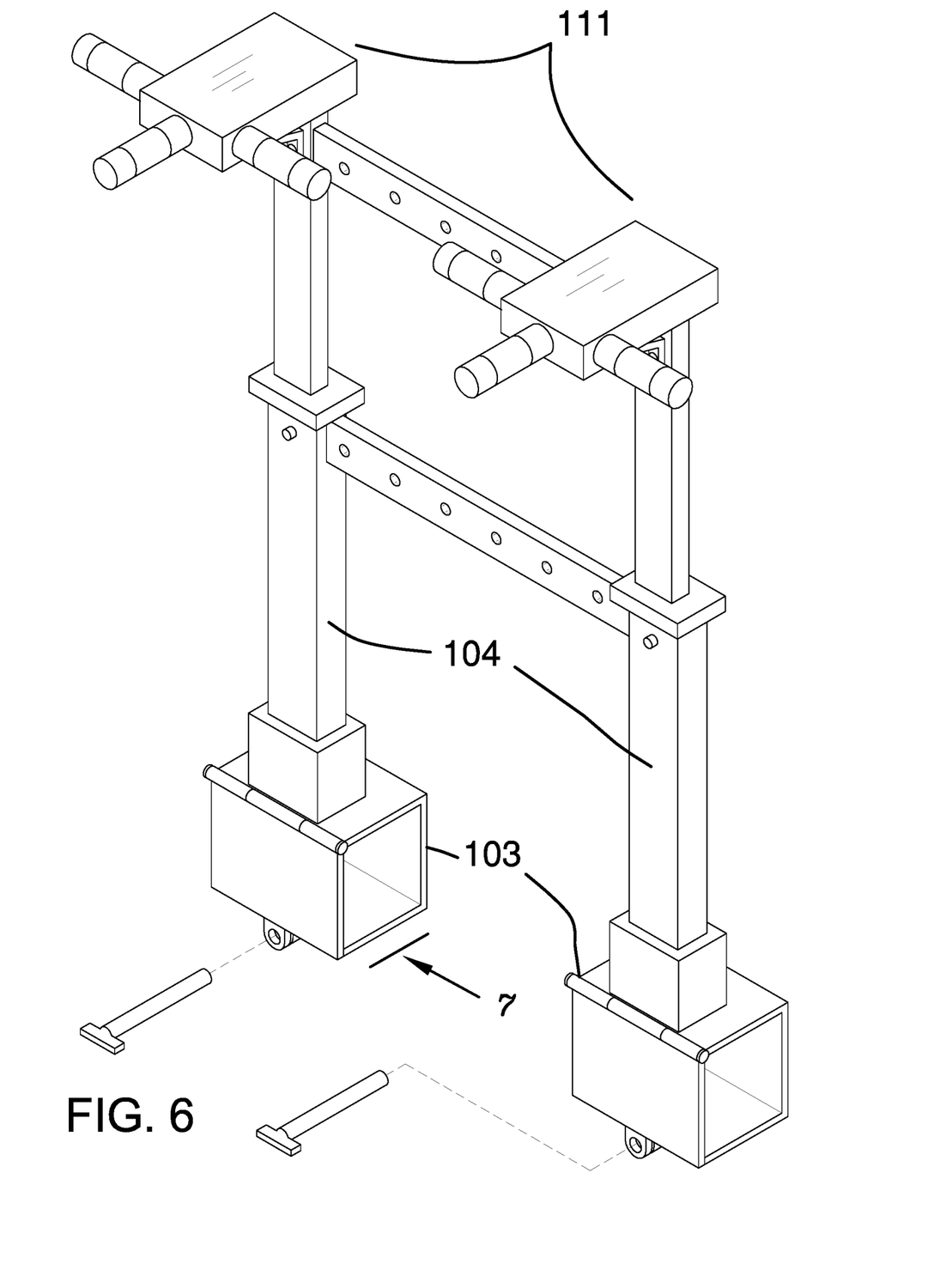
FIG. 6 is a view of an embodiment of the disclosure.
Figure 7A:
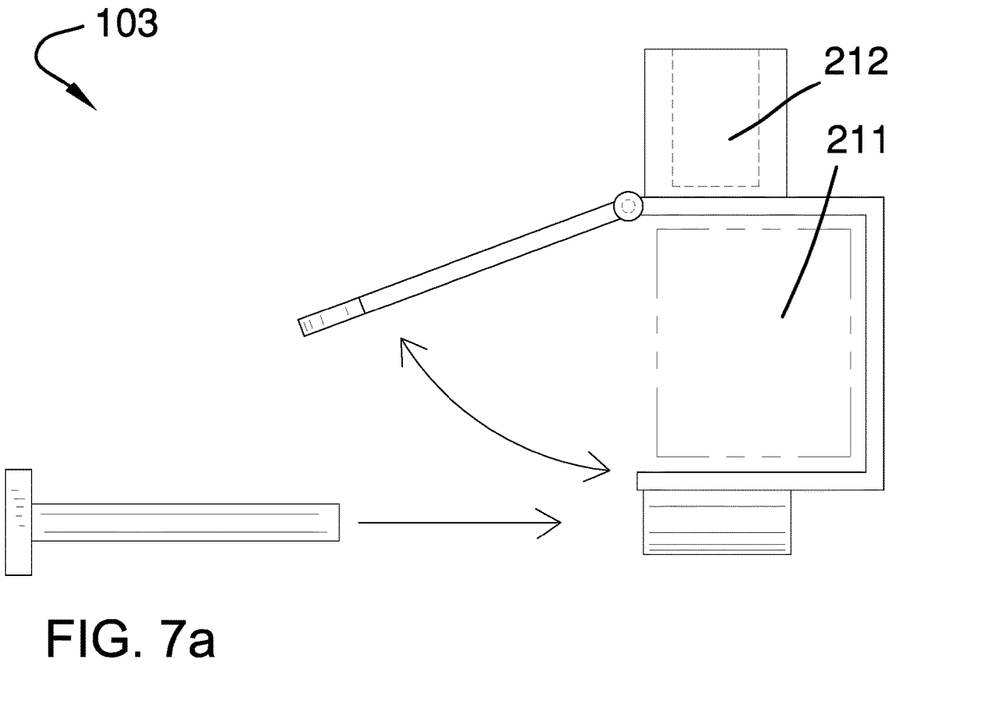
FIG. 7A is a side detail view of an embodiment of the disclosure.
Figure 7B:
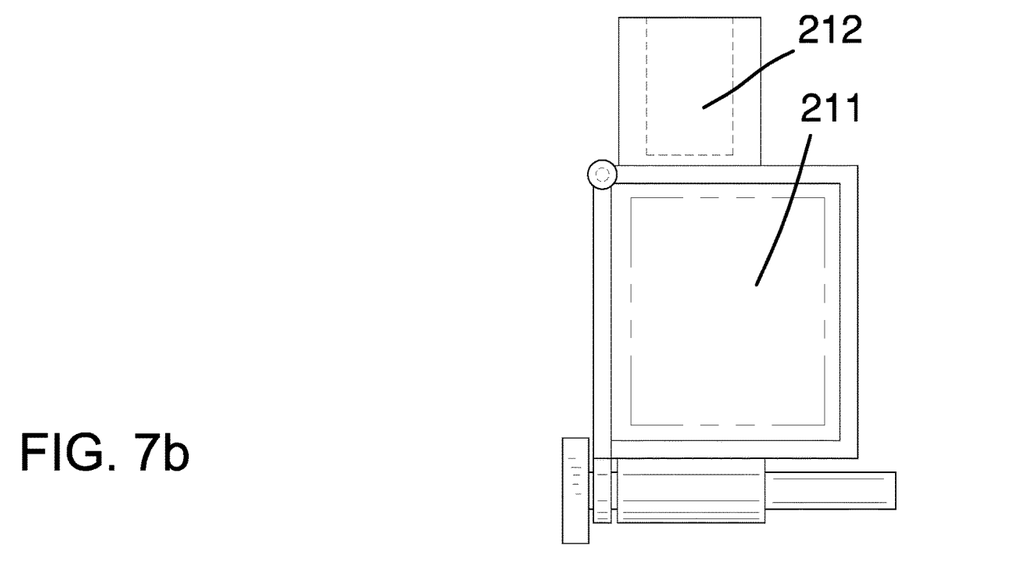
FIG. 7B is a side detail view of an embodiment of the disclosure.
Figure 8:
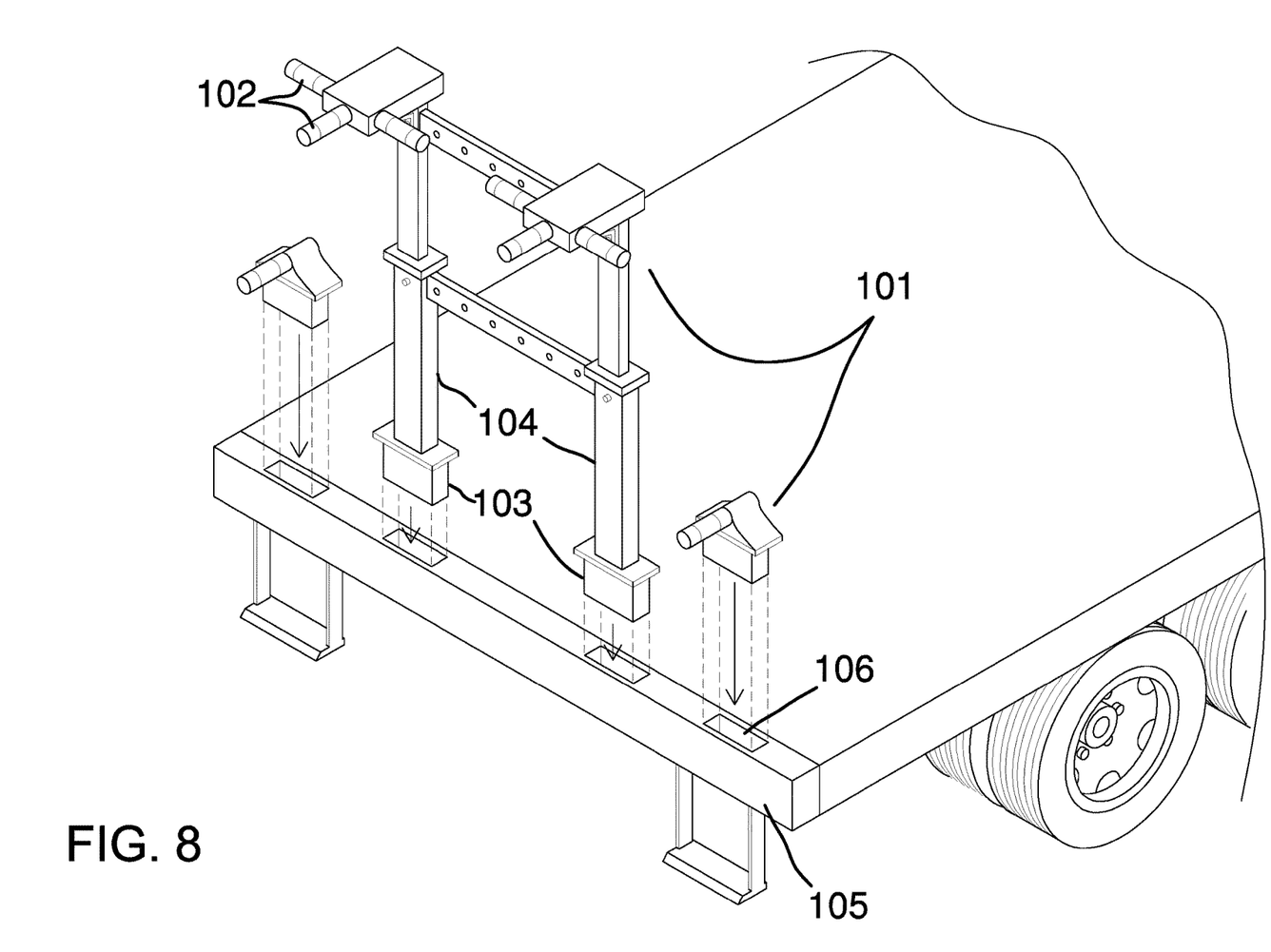
FIG. 8 is a perspective view of an embodiment of the disclosure.
Figure 9:
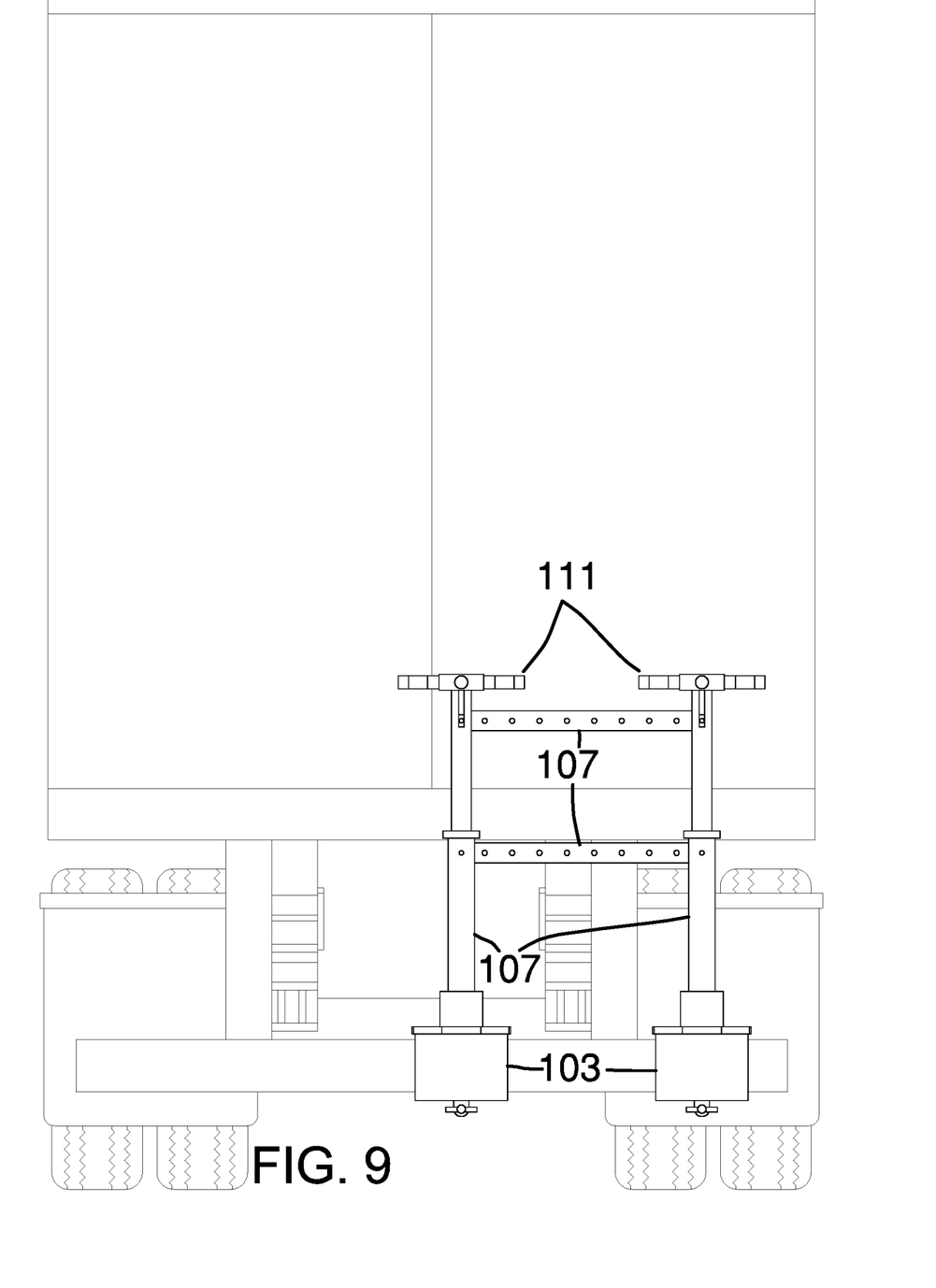
FIG. 9 is a rear view of an embodiment of the disclosure.

Detailed reference will now be made to one or more potential embodiments of the disclosure, which are illustrated in FIGS. 1 through 9.

The portable exercise system for use with a trailer or truck frame 100 (hereinafter invention) is configured for use with a trailer 105. The trailer 105 is further configured with a one or more bumper slots 106 located on the rear bumper of the trailer 105. Each of the one or more bumper slots 106 is a rectangular prism-shaped negative space formed in the superior 193 surface of the rear bumper. The invention 100 is configured for use in exercise. Specifically, the invention 100 is a kit that creates static structures that are attached to the trailer 105 using the one or more bumper slots 106. The invention 100 comprises a plurality of removable bollards 101 and a plurality of grips 102. The plurality of removable bollards 101 attach the plurality of grips 102 to the one or more bumper slots 106. The plurality of removable bollards 101 form the static structures. The plurality of grips 102 allow for exercises that require a controlled change in elevation relative to the horizontal surface formed by the trailer 105.

It is explicitly acknowledged that the one or more bumper slots 106 used by the invention 100 are also commonly found on the tractor element of a tractor-trailer 105. However, the specification and claims of this disclosure will hereinafter implicitly assume that the one or more bumper slots 106 are located on the rear bumper of a trailer 105. This is done for the purposes of simplicity and for clarity of exposition of the disclosure is not intended to limit the scope of the appended claims. Those skilled in the art will recognize that the innovations described in this disclosure can be readily modified to accommodate the one or more bumper slots 106 commonly found on a tractor with a minimum of modification and experimentation.

The trailer 105 is further defined with a posterior 191 direction, an anterior 192 direction, a superior 193 direction, an inferior 194 direction, an inferior 194 direction, a left 195 direction, and a right 196 direction. Within this disclosure, the "face" of any object refers to the surface of the object that faces a direction selected from the group consisting of the posterior 191 direction, the anterior 192 direction, the superior 193 direction, the inferior 194 direction, the left 195 direction, the right 196 direction. The face designation will correspond to the selected direction.

Each of the plurality of removable bollards 101 attaches each of the plurality of grips 102 to the one or more bumper slots 106 such that the plurality of grips 102 can be used for exercises requiring a change in elevation. Each of the plurality of removable bollards 101 is an extension structure that raises the elevation of each of the plurality of grips 102 above the one or more bumper slots 106. Each of the plurality of removable bollards 101 inserts into a bumper slot selected from the one or more bumper slots 106. The plurality of removable bollards 101 comprises a primary bollard 111 and a plurality of dip bollards 112.

The primary bollard 111 is the removable bollard selected from the plurality of removable bollards 101 used for exercises that are intended to increase the elevation of a user. Such exercises include, but are not limited to, exercises commonly referred to as pull-ups and chin-ups. The primary bollard 111 anchors to a bumper slot selected from the one or more bumper slots 106 such that the primary bollard 111 will not shift during use. The primary bollard 111 comprises a primary stanchion 121, a primary jib 122, a primary gusset 123, a detent port 126, and a plurality of mortises 125. The primary stanchion 121 is further defined with a first end 181 and a second end 182. The primary jib 122 is further defined with a third end 183 and a fourth end 184. The primary gusset 123 is further defined with a fifth end 185 and a sixth end 186. The primary stanchion 121 and the primary jib 122 form a cant 197.

The primary stanchion 121 is an extension structure that separates one or more tenons selected from the plurality of grips 102 from the one or more bumper slots 106. The primary stanchion 121 is a prism-shaped shaft that is geometrically similar to each of the one or more bumper slots 106. The primary stanchion 121 is a vertically oriented structure. The primary stanchion 121 attaches to the trailer 105 using the one or more bumper slots 106. The primary stanchion 121 is sized such that the first end 181 of the primary stanchion 121 will insert into a bumper slot selected from the one or more bumper slots 106.

The primary jib 122 is an extension structure that separates one or more tenons selected from the plurality of grips 102 from the primary stanchion 121. The primary jib 122 is a prism-shaped shaft. The primary jib 122 is a horizontally oriented structure. The primary jib 122 attaches to the primary stanchion 121 in the manner of a cantilever. The third end 183 of the primary jib 122 attaches to the posterior 191 face of the primary stanchion 121 at the second end 182. The primary jib attaches to the primary stanchion 121 such that the center axis of the primary jib 122 intersects perpendicularly with the center axis of the primary stanchion 121. The primary jib 122 supports one or more tenons selected from the plurality of grips 102 during exercise.

The primary gusset 123 is a prism-shaped shaft. The primary gusset 123 is a brace that reinforces the primary jib 122. The primary gusset 123 attaches to both the primary stanchion 121 and the primary jib 122 such that the torqueing forces applied to the primary jib 122 are minimized. The fifth end 185 of the primary gusset 123 attaches to the posterior 191 face of the primary stanchion 121 such that the primary gusset 123 and the primary stanchion 121 form a cant 197. The sixth end 186 of the primary gusset 123 attaches to the inferior 194 face of the primary jib 122.

The detent port 126 is an aperture that is formed in the primary stanchion 121. The detent port 126 forms an aperture that receives a cotter pin that secures the primary stanchion 121 to an extension stanchion selected from the plurality of extension stanchions 104. The plurality of extension stanchions 104 are described in greater detail elsewhere in this disclosure.

The plurality of mortises 125 are prism-shaped negative spaces that are formed in the primary jib 122 of the primary bollard 111. In the first potential embodiment of the disclosure, the plurality of mortises 125 are identical and have a cylindrical shape. Each of the plurality of mortises 125 is sized to receive a tenon selected from the plurality of grips 102 such that the selected tenon is removably attached to the primary jib 122. The plurality of mortises 125 comprises a second mortise 152, a third mortise 153, and a fourth mortise 154.

The second mortise 152 is a prism-shaped negative space that is formed in the left 195 face of the primary jib 122 proximal to the fourth end 184. The second mortise 152 is geometrically similar to the second tenon 142. The second mortise 152 is sized such that the second tenon 142 inserts into the second mortise 152. The second mortise 152 has a cylindrical shape.

The third mortise 153 is a prism-shaped negative space that is formed in the anterior 192 face of the primary jib 122. The third mortise 153 is geometrically similar to the third tenon 143. The third mortise 153 is sized such that the third tenon inserts into the third mortise 153. The third mortise 153 has a cylindrical shape.

The fourth mortise 154 is a prism-shaped negative space that is formed in the right 196 face of the primary jib 122 proximal to the fourth end 184. The fourth mortise 154 is geometrically similar to the fourth tenon 144. The fourth mortise 154 is sized such that the fourth tenon 144 inserts into the fourth mortise 154. The fourth mortise 154 has a cylindrical shape.

The plurality of dip bollards 112 is the removable bollard selected from the plurality of removable bollards 101 used for exercises that are intended to decrease the elevation of a user. Such exercises include, but are not limited to, exercises commonly referred to as dips. Each of the plurality of dip bollards 112 anchors to a bumper slot selected from the one or more bumper slots 106 such that the plurality of dip bollards 112 will not shift during use. The plurality of dip bollards 112 comprises a first dip bollard 131 and a second dip bollard 132. The first dip bollard 131 and the second dip bollard 132 are intended to be used together.

The first dip bollard 131 is a removable bollard selected from the plurality of dip bollards 112 used for exercises that are intended to decrease the elevation of a user. Such exercises include, but are not limited to, exercises commonly referred to as dips. The first dip bollard 131 comprises a first stanchion 161, a first stop ridge 162, and a fifth mortise 155. The first stanchion 161 is further defined with a seventh end 187 and an eighth end 188.

The first stanchion 161 is an extension structure that separates a tenon selected from the plurality of grips 102 from the one or more bumper slots 106. The first stanchion 161 is a prism-shaped shaft that is geometrically similar to each of the one or more bumper slots 106. The first stanchion 161 is a vertically oriented structure. The first stanchion 161 attaches to the trailer 105 using the one or more bumper slots 106. The first stanchion 161 is sized such that the seventh end 187 of the first stanchion 161 will insert into a bumper slot selected from the one or more bumper slots 106.

The first stop ridge 162 is a rectilinear ring that is formed around the perimeter of the first stanchion 161 formed by the following faces: the posterior 191 face, the left 195 face, the anterior 192 face, and the right 196 face of the first stanchion 161. The outer dimension of the first stop ridge 162 is greater than the inner dimension of any bumper slot selected from the one or more bumper slots 106 such that the first stop ridge 162 will limit the depth that the first stanchion 161 inserts into the selected bumper slot.

The fifth mortise 155 is a prism-shaped negative space that is formed in the posterior 191 face of the first stanchion 161 at a superior 193 position relative to the first stop ridge 162. The fifth mortise 155 is geometrically similar to the fifth tenon 145. The fifth mortise 155 is sized such that the fifth tenon 145 inserts into the fifth mortise 155. The fifth mortise 155 has a cylindrical shape.

The second dip bollard 132 is a removable bollard selected from the plurality of dip bollards 112 used for exercises that are intended to decrease the elevation of a user. Such exercises include, but are not limited to, exercises commonly referred to as dips. The second dip bollard 132 comprises a second stanchion 171, a second stop ridge 172, and a sixth mortise 156. The second stanchion 171 is further defined with a ninth end 189 and a tenth end 190.

The second stanchion 171 is an extension structure that separates a tenon selected from the plurality of grips 102 from the one or more bumper slots 106. The second stanchion 171 is a prism-shaped shaft that is geometrically similar to each of the one or more bumper slots 106. The second stanchion 171 is a vertically oriented structure. The second stanchion 171 attaches to the trailer 105 using the one or more bumper slots 106. The second stanchion 171 is sized such that the ninth end 189 of the second stanchion 171 will insert into a bumper slot selected from the one or more bumper slots 106.

The second stop ridge 172 is a rectilinear ring that is formed around the perimeter of the second stanchion 171 formed by the following faces: the posterior 191 face, the left 195 face, the anterior 192 face, and the right 196 face of the second stanchion 171. The outer dimension of the second stop ridge 172 is greater than the inner dimension of any bumper slot selected from the one or more bumper slots 106 such that the second stop ridge 172 will limit the depth that the second stanchion 171 inserts into the selected bumper slot.

The sixth mortise 156 is a prism-shaped negative space that is formed in the posterior 191 face of the second stanchion 171 at a superior 193 position relative to the second stop ridge 172. The sixth mortise 156 is geometrically similar to the sixth tenon 146. The sixth mortise 156 is sized such that the sixth tenon 146 inserts into the sixth mortise 156. The sixth mortise 156 has a cylindrical shape.

Each of the plurality of grips 102 is a handhold used to grasp the invention 100 during exercises requiring a change in elevation. Each of the plurality of grips 102 removably attaches to a removable bollard selected from the plurality of removable bollards 101. The plurality of grips 102 comprises a second tenon 142, a third tenon 143, a fourth tenon 144, a fifth tenon 145, and a sixth tenon 146.

The second tenon 142 is a prism-shaped structure. The second tenon 142 is geometrically similar to the second mortise 152 such that the second tenon 142 inserts into the second mortise 152 to attach the second tenon 142 to the primary bollard 111. The second tenon 142 has a cylindrical shape.

The third tenon 143 is a prism-shaped structure. The third tenon 143 is geometrically similar to the third mortise 153 such that the third tenon 143 inserts into the third mortise 153 to attach the third tenon 143 to the primary bollard 111. The third tenon 143 has a cylindrical shape.

The fourth tenon 144 is a prism-shaped structure. The fourth tenon 144 is geometrically similar to the fourth mortise 154 such that the fourth tenon 144 inserts into the fourth mortise 154 to attach the fourth tenon 144 to the primary bollard 111. The fourth tenon 144 has a cylindrical shape.

The fifth tenon 145 is a prism-shaped structure. The fifth tenon 145 is geometrically similar to the fifth mortise 155 such that the fifth tenon 145 inserts into the fifth mortise 155 to attach the fifth tenon 145 to the first dip bollard 131. The fifth tenon 145 has a cylindrical shape.

The sixth tenon 146 is a prism-shaped structure. The sixth tenon 146 is geometrically similar to the sixth mortise 156 such that the sixth tenon 146 inserts into the sixth mortise 156 to attach the sixth tenon 146 to the second dip bollard 132. The sixth tenon 146 has a cylindrical shape.

In the first potential embodiment of the disclosure, the second tenon 142, the third tenon 143, the fourth tenon 144, the fifth tenon 145, and the sixth tenon 146 are identical.

In a second potential embodiment of the disclosure, the invention 100 further comprises a plurality of anchor clamps 103, a plurality of extension stanchions 104, and a plurality of crossbeams 107. The second potential embodiment of the disclosure is configured for use with a trailer 104 that is not provisioned with a plurality of bumper slots 106.

Each of the plurality of anchor clamps 103 attaches to the bumper of the trailer 105 such that each anchor clamp selected from the plurality of anchor clamps 103 presents a base port 212 aperture that performs the function of a bumper slot selected from the plurality of bumper slots 106. Each of the plurality of anchor clamps 103 is identical. Each of the plurality of anchor clamps 103 comprises a bumper clamp 211 and the base port 212. The base port 212 attaches to the bumper clamp 211. The bumper clamp 211 attaches to the bumper of the trailer 105 such that the base port 212 is accessible from the superior surface of the bumper clamp 211. The base port 212 is an aperture that is geometrically similar to both the primary stanchion 121 of the primary bollard 111 and the third stanchion 221 of any extension stanchion selected from the plurality of extension stanchions 221. Both the primary stanchion 121 of the primary bollard 111 and the third stanchion 221 of any extension stanchion selected from the plurality of extension stanchions 221 insert into the base port 212.

Each of the plurality of extension structures 104 is an inert structure. Each of the plurality of extension structures 104 is an inert structure. Each extension structure selected from the plurality of extension structures 104 is an inert structure increases the elevation of a removable bollard selected from the plurality of removable bollards 101. Each of the plurality of extension structures 104 comprises a third stanchion 221 and a raised port 222. The third stanchion 221 is a rigid vertical shaft that forms extension structure that elevates the selected removable bollard. The raised port 222 is an aperture formed in the superior end of the third stanchion 221. The raised port 222 is sized to receive the primary stanchion 121 of a bollard selected from the group consisting of the primary bollard 121, the first bollard 131, and the second bollard 132.

Each of the plurality of crossbeams 107 is a rigid shaft that stabilizes the invention 100. Each of the plurality of crossbeams makes an attachment selected from the group consisting of: a) attaching the first primary stanchion 121 of a first removable bollard selected from the plurality of removable bollards 101 to the first primary stanchion 121 of a second removable bollard selected from the plurality of removable bollards 101; and, b) attaching the third stanchion 221 of a first extension structure selected from the plurality of extension structures 104 to the third stanchion 221 of a second extension structure selected from the plurality of extension structures 104. The plurality of crossbeams 107 comprises a superior crossbeam 201 and an inferior crossbeam 202. The superior crossbeam 201 attaches the first primary stanchion 121 of a first removable bollard selected from the plurality of removable bollards 101 to the first primary stanchion 121 of a second removable bollard selected from the plurality of removable bollards 101. The inferior crossbeam 202 attaches the third stanchion 221 of a first extension structure selected from the plurality of extension structures 104 to the third stanchion 221 of a second extension structure selected from the plurality of extension structures 104.

The following definitions and directional references were used in this disclosure:

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Bollard: As used in this disclosure, a bollard is a heavy vertical stanchion used as an anchor point to anchor an object to a horizontal surface. Bollards are often called Samson posts.

Brace: As used in this disclosure, a brace is a structural element that is used to support or otherwise steady an object.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding one mechanical part in relation to another in a manner such that the device can be released by force applied to one or more of the parts.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on.

Extension Structure: As used in this disclosure, an extension structure is an inert physical structure that is used to extend the span of the distance between any two objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Gusset: As used in this disclosure, a gusset is an angled structural member used to form a portion of the load path of a section of a framework. By angled is meant that the gusset is neither parallel nor perpendicular to the force of gravity.

Force of Gravity: As used in this disclosure, the force of gravity refers to a vector that indicates the direction of the pull of gravity on an object at or near the surface of the earth.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inert: As used in this disclosure, inert is an adjective that is applied to an object, system, or chemical reaction. Inert means that the object, system, or chemical reaction is incapable of motion or activity or is otherwise unreactive.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Mortise: As used in this disclosure, a mortise is a prism-shaped negative spaced formed in an object that is designed to receive a geometrically similar object referred to as a tenon.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Port: As used in this disclosure, a port is an opening formed in a first object that allows a second object to pass through a boundary formed by the first object.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ridge: As used in this disclosure, a ridge is a rectangular block structure attaches to and projects vertically away from away from a surface.

Stanchion: As used in this disclosure, a stanchion refers to a vertical pole, post, or support. See beam and gusset and strut.

Superior: As used in this disclosure, the term superior refers to a directional reference that is parallel to and in the opposite direction of the force of gravity when an object is positioned or used normally.

Tenon: As used in this disclosure, a tenon is a prism-shaped structure that fits into a mortise such that the tenon attaches to the mortise. The tenon is geometrically similar to the mortise.

Torque: As used in this disclosure, a torque refers to a force that causes an object to rotate.

Tractor: As used in this disclosure, a tractor is a vehicle having a cab, no body and a powerful diesel or gasoline powered engine that is used to pull one or more trailers.

Trailer: As used in this disclosure, a trailer is an unpowered wheeled vehicle that is towed by a powered vehicle such as a tractor.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

The directional references used in this disclosure correspond to the directional references from the perspective of the vehicle. The anterior or front side is the side of the vehicle proximal to the primary sense of direction. The posterior or rear side is the side of the vehicle that is distal from the anterior side. The inferior side is the side of the vehicle that is closest to the ground. The superior side of the vehicle is the side of the vehicle that is distal to the inferior side. The left side is to the left side of a person facing the direction of the primary sense of direction of the vehicle. The right side is the side of the vehicle that is distal from the left side. The terms distal and medial refer to a hypothetical line that is drawn through the center point of the vehicle and that is parallel to the primary sense of direction. When comparing a first object to a second object, the first object is said to be the distal object if the span of the perpendicular distance from the first object the hypothetical line is greater than the span of the perpendicular distance from the second object to the hypothetical line. A first object is said to be the medial object if the span of the perpendicular distance from the first object the hypothetical line is less than the span of the perpendicular distance from the second object to the hypothetical line.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An exercise device comprising:
   a plurality of removable bollards and a plurality of grips;
   wherein the plurality of grips attach to the plurality of bollards;
   wherein the exercise device is for use with a trailer;
   wherein the trailer is further defined with a one or more bumper slots located on a rear bumper of the trailer;
   wherein each of the one or more bumper slots is a rectangular prism-shaped negative space formed in a superior surface of the rear bumper;
   wherein the trailer is further defined with a posterior direction, an anterior direction, a superior direction, an inferior direction, an inferior direction, a left direction, and a right direction;
   wherein the exercise device is configured for use in exercise;
   wherein exercise device is a kit;
   wherein the exercise device creates static structures that are attached to the trailer using the one or more bumper slots;
   wherein each of the plurality of removable bollards inserts into a bumper slot selected from the one or more bumper slots.

2. The exercise device according to claim 1
   wherein the plurality of removable bollards form the static structures;
   wherein the plurality of grips allow for exercises that require a controlled change in elevation relative to a horizontal surface formed by the trailer;
   wherein each of the plurality of removable bollards is an extension structure that raises the elevation of each of the plurality of grips above the one or more bumper slots;
   wherein the plurality of grips further comprises a collection of tenons;
   wherein each of the plurality of grips is a handhold;
   wherein each of the plurality of grips removably attaches to a removable bollard selected from the plurality of removable bollards.

3. The exercise device according to claim 2
   wherein the plurality of removable bollards comprises a primary bollard and a plurality of dip bollards;
   wherein the primary bollard is a removable bollard selected from the plurality of removable bollards used for exercises that are intended to increase the elevation of a user;
   wherein the plurality of dip bollards are removable bollards selected from the plurality of removable bollards used for exercises that are intended to decrease the elevation of a user.

4. The exercise device according to claim 3
   wherein the primary bollard anchors to a bumper slot selected from the one or more bumper slots such that the primary bollard will not shift;
   wherein each of the plurality of dip bollards anchors to a bumper slot selected from the one or more bumper slots such that the plurality of dip bollards will not shift.

5. The exercise device according to claim 4
   wherein the primary bollard comprises a primary stanchion, a primary jib, a primary gusset, a primary stop ridge, and a plurality of mortises;
   wherein the primary stanchion, the primary jib, the primary gusset, the primary stop ridge, and the plurality of mortises are interconnected;
   wherein the primary stanchion is further defined with a first end and a second end;
   wherein the primary jib is further defined with a third end and a fourth end;
   wherein the primary gusset is further defined with a fifth end and a sixth end;
   wherein the primary stanchion and the primary jib form a cant.

6. The exercise device according to claim 5
   wherein the primary stanchion is an extension structure;
   wherein the primary stanchion is a vertically oriented structure;
   wherein the primary stanchion attaches to the trailer;
   wherein the primary stanchion that separates the primary jib from the one or more bumper slots;
   wherein the primary jib is an extension structure that separates one or more tenons selected from the plurality of grips from the primary stanchion;
   wherein the primary jib is a horizontally oriented structure;
   wherein the primary jib attaches to the primary stanchion in the manner of a cantilever;
   wherein the primary gusset is a brace that reinforces the primary jib;
   wherein the plurality of mortises are prism-shaped negative spaces that are formed in the primary jib;
   wherein the plurality of mortises are identical and have a cylindrical shape;
   wherein each of the plurality of mortises is sized to receive a tenon selected from the plurality of grips such that the selected tenon is removably attached to the primary jib.

7. The exercise device according to claim 6
   wherein the primary stanchion is a prism-shaped shaft that is geometrically similar to each of the one or more bumper slots;
   wherein the primary stanchion is sized such that the first end of the primary stanchion will insert into a bumper slot selected from the one or more bumper slots.

8. The exercise device according to claim 7
   wherein the primary jib is a prism-shaped shaft;
   wherein the third end of the primary jib attaches to a posterior face of the primary stanchion at the second end;
   wherein the primary jib attaches to the primary stanchion such that the center axis of the primary jib intersects perpendicularly with a center axis of the primary stanchion.

9. The exercise device according to claim 8
wherein the primary gusset is a prism-shaped shaft;
wherein the primary gusset attaches to both the primary stanchion and the primary jib;
wherein the fifth end of the primary gusset attaches to the posterior face of the primary stanchion such that the primary gusset and the primary stanchion form a cant;
wherein the sixth end of the primary gusset attaches to an inferior face of the primary jib.

10. The exercise device according to claim 9
wherein the primary stop ridge is a rectilinear ring that is formed around a perimeter of the primary stanchion formed by the following faces: the posterior face, a left face, an anterior face, and a right face of the primary stanchion;
wherein an outer dimension of the primary stop ridge is greater than an inner dimension of any bumper slot selected from the one or more bumper slots.

11. The exercise device according to claim 10
wherein the plurality of mortises comprises a first mortise, a second mortise, and a third mortise;
wherein the first mortise is a prism-shaped negative space that is formed in a left face of the primary jib proximal to the fourth end;
wherein the second mortise is a prism-shaped negative space that is formed in an anterior face of the primary jib;
wherein the third mortise is a prism-shaped negative space that is formed in a right face of the primary jib proximal to the fourth end.

12. The exercise device according to claim 11
wherein the plurality of dip bollards comprises a first dip bollard and a second dip bollard;
wherein the first dip bollard and the second dip bollard are used together.

13. The exercise device according to claim 12
wherein the first dip bollard comprises a first stanchion, a first stop ridge, and a fourth mortise;
wherein the second dip bollard comprises a second stanchion, a second stop ridge, and a fifth mortise;
wherein the first stop ridge and the fourth mortise are formed on the first stanchion;
wherein the second stop ridge and the fifth mortise are formed on the second stanchion;
wherein the first stanchion is further defined with a seventh end and an eighth end;
wherein the second stanchion is further defined with a ninth end and a tenth end.

14. The exercise device according to claim 13
wherein the first stanchion is a prism-shaped shaft that is geometrically similar to each of the one or more bumper slots;
wherein the second stanchion is a prism-shaped shaft that is geometrically similar to each of the one or more bumper slots;
wherein the first stanchion is a vertically oriented structure;
wherein the second stanchion is a vertically oriented structure;
wherein the first stanchion is sized such that the seventh end of the first stanchion will insert into a bumper slot selected from the one or more bumper slots;
wherein the second stanchion is sized such that the ninth end of the second stanchion will insert into a bumper slot selected from the one or more bumper slots.

15. The exercise device according to claim 14
wherein the first stop ridge is a rectilinear ring that is formed around a perimeter of the first stanchion formed by the following faces: a posterior face, a left face, an anterior face, and a right face of the first stanchion;
wherein an outer dimension of the first stop ridge is greater than a inner dimension of any bumper slot selected from the one or more bumper;
wherein the second stop ridge is a rectilinear ring that is formed around the perimeter of the second stanchion formed by the following faces: the posterior face, the left face, the anterior face, and the right face of the second stanchion;
wherein the outer dimension of the second stop ridge is greater than the inner dimension of any bumper slot selected from the one or more bumper.

16. The exercise device according to claim 15
wherein the fourth mortise is a prism-shaped negative space that is formed in the posterior face of the first stanchion at a superior position relative to the first stop ridge;
wherein the fifth mortise is a prism-shaped negative space that is formed in the posterior face of the second stanchion at a superior position relative to the second stop ridge;
wherein the plurality of grips comprises a first tenon, a second tenon, a third tenon, a fourth tenon, and a fifth tenon;
wherein the first tenon has a cylindrical shape;
wherein the second tenon has a cylindrical shape;
wherein the third tenon has a cylindrical shape;
wherein the fourth tenon has a cylindrical shape;
wherein the fifth tenon has a cylindrical shape;
wherein the first mortise is geometrically similar to the first tenon;
wherein the second mortise is geometrically similar to the second tenon;
wherein the third mortise is geometrically similar to the third tenon;
wherein the fourth mortise is geometrically similar to the fourth tenon;
wherein the fifth mortise is geometrically similar to the fifth tenon;
wherein the first tenon inserts into the first mortise to attach the first tenon to the primary bollard;
wherein the second tenon inserts into the second mortise to attach the second tenon to the primary bollard;
wherein the third tenon inserts into the third mortise to attach the third tenon to the primary bollard;
wherein the fourth tenon inserts into the fourth mortise to attach the fourth tenon to the first dip bollard;
wherein the fifth tenon inserts into the fifth mortise to attach the fifth tenon to the second dip bollard;
wherein the first tenon, the second tenon, the third tenon, the fourth tenon, and the fifth tenon are identical.

* * * * *